Oct. 25, 1927.  
E. J. MARTEL  
1,646,970  
AUTOMOBILE LOCK  
Filed Dec. 13, 1923   3 Sheets-Sheet 1
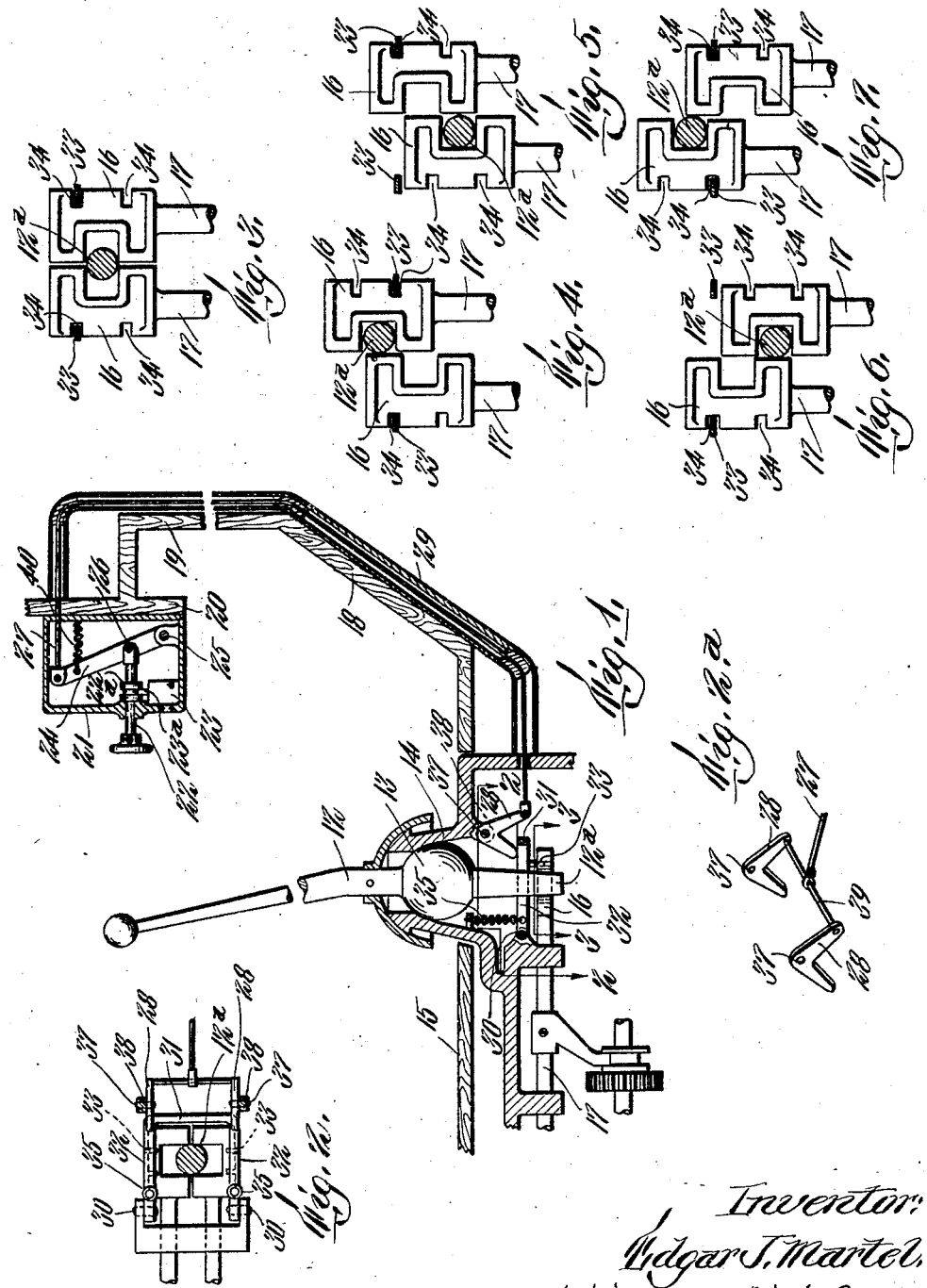

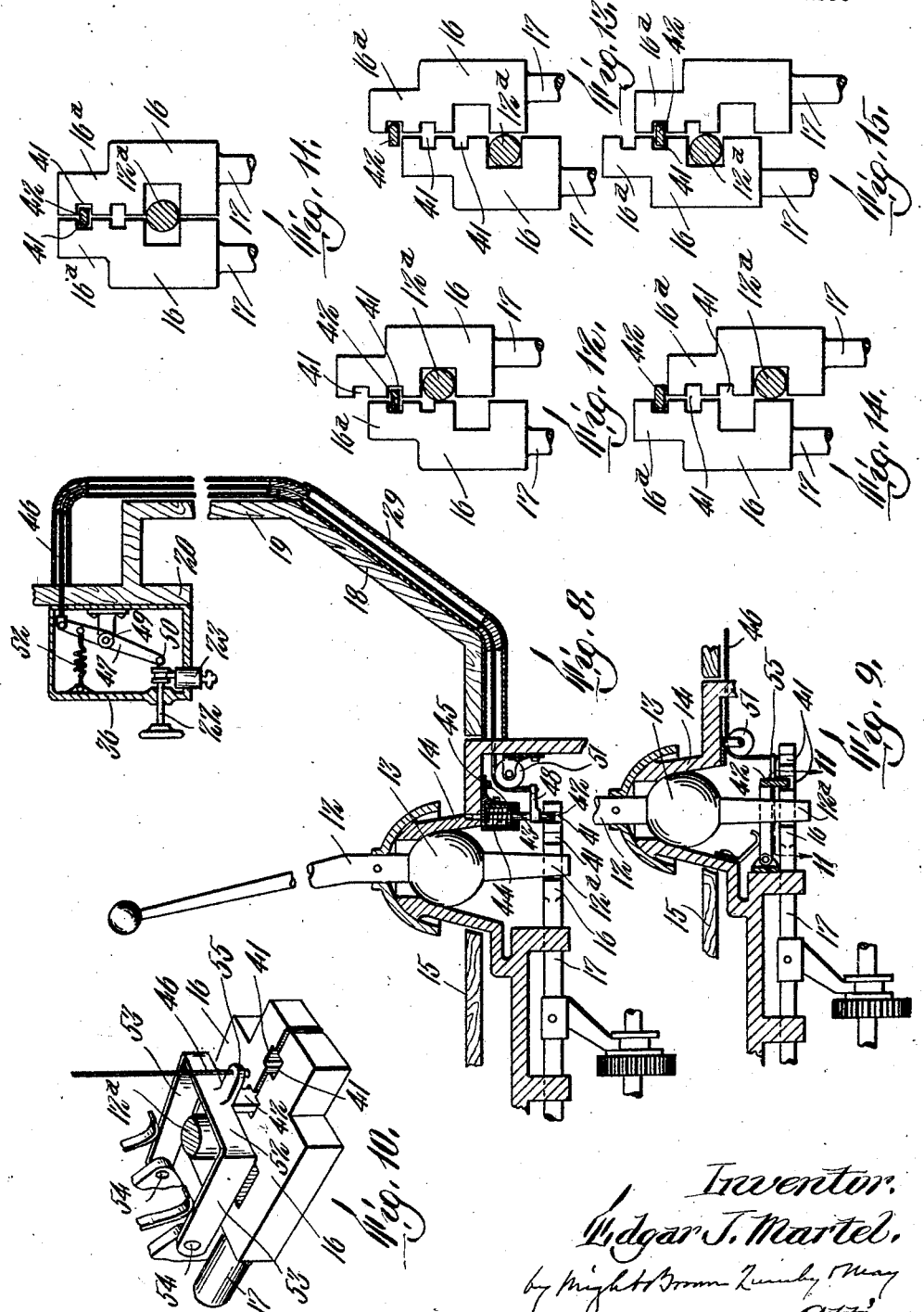

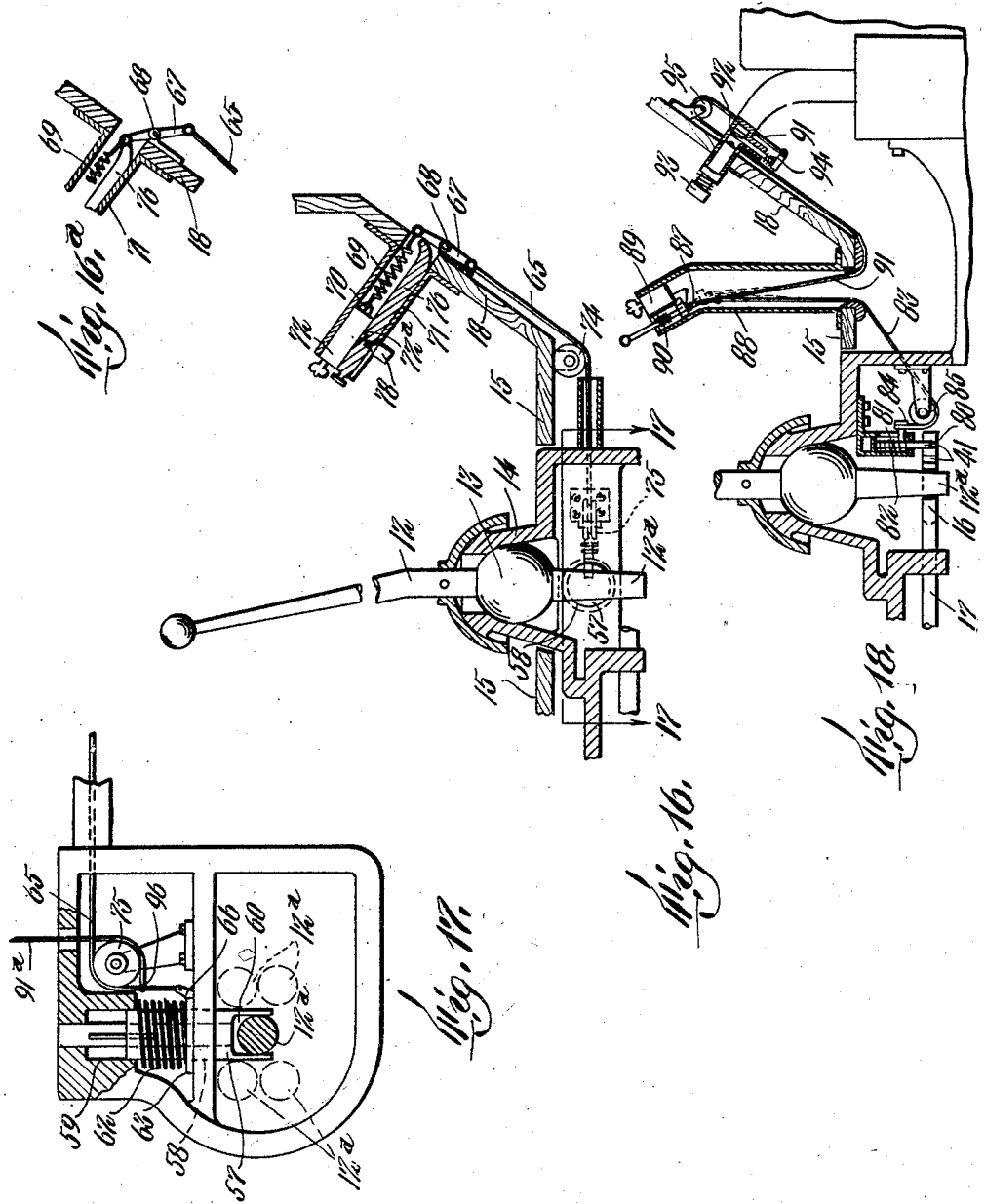

Patented Oct. 25, 1927.

1,646,970

UNITED STATES PATENT OFFICE.

EDGAR J. MARTEL, OF LACONIA, NEW HAMPSHIRE.

AUTOMOBILE LOCK.

Application filed December 13, 1923. Serial No. 680,370.

The object of this invention is to provide means including a slidable handle or member movable by the driver of an automobile, whereby the transmission may be inoperatively locked by the use of a suitable key, with the gear shift lever and rods thereof in various positions, to prevent unauthorized use of the vehicle, and unlocked and made operative by the use of the same key.

I attain this object by the improvements variously embodied as hereinafter described and claimed.

Of the accompanying drawings forming a part of this specification,—

Figure 1 is a vertical section through a portion of the floor and dashboard of an automobile illustrating an embodiment of the invention.

Figure 2 is a section on line 2—2 of Figure 1.

Figure 2a is a perspective view, showing certain details.

Figure 3 is a section on line 3—3 of Figure 1.

Figures 4 to 7 inclusive, are views similar to Figure 3, showing the parts in different relative positions.

Figure 8 is a view similar to Figure 1, showing another embodiment of the invention.

Figure 9 is a view similar to a portion of Figure 8, showing a modification of the construction shown by said figure.

Figure 10 is a perspective view further illustrating the modification shown by Figure 9.

Figure 11 is a section on line 11—11 of Figure 9.

Figures 12, 13, 14 and 15 are views similar to Figure 11, showing the parts in different relative positions.

Figure 16 is a view similar to Figure 1, showing another modification.

Figure 16a is a view similar to a portion of Figure 16.

Figure 17 is a section on line 17—17 of Figure 16.

Figure 18 is a view similar to Figure 1, showing a modification of the locking member and of the means for operating the same.

The same reference characters indicate the same parts in all of the figures.

Referring first to Figures 1 to 7, inclusive, 12 designates the usual gear shift lever of an automobile transmission, the same being supported to have a universal tipping movement by the ball and socket joint members 13 and 14, the member 14 being fixed and projecting above the horizontal floor 15. The lower arm 12a of the gear shift lever projects below the floor and cooperates, as usual, with the notched heads 16 of the usual gear shift rods 17.

The horizontal floor 15 joins an inclined floor portion 18, which in turn joins a vertical wall portion 19. Positioned rearwardly from the wall portion is the dashboard 20, to which is fixed a casing 21, supporting a manually slidable rod 22, a lock 23 for locking said rod in a predetermined position, and a cable-engaging lever 24, pivoted at 25 to the casing, and at 26 to the lever. A flexible cable 27 is fixed at one end to the swinging end of the lever, and at the other end to the bell-crank levers 28, pivoted at 37 to a fixed support and associated with the transmission locking member hereinafter described. The cable passes through, and is guarded by a fixed tubular conduit 29, as shown by Figure 1.

Pivoted by studs 30 (Figure 2) to a fixed support below the floor, is a locking member composed of a neck portion 31, arm portions 32, and locking dogs 33 formed on the arm portions, and adapted to engage slots 34, formed for their reception in the heads 16 of the gear shift rods, the arrangement being such that the heads may be locked by the dogs selectively in any of the various relative positions shown by Figures 3 to 7, thus preventing operative movements of the gear shift lever.

The locking member is normally held in a raised position by springs 35, to hold the dogs out of engagement with the slots, and is adapted to be depressed by the bell-crank levers 28, to cause the engagement of the dogs with the slots.

The bell-crank levers are spaced apart and pivoted at 37 to fixed ears 38. The cable 27 is secured to a rod 39 (Figure 2a) connecting said levers. The shorter arms of the levers bear on the arm portions 32 of the locking member and are caused by the cable 27 to depress the locking member and hold it in the locking position shown by Figure 1, when the cable 27 is under tension. This is the case when the slidable rod 22 is pulled outward and locked by the engagement of the bolt 23a of the lock 23, with a grooved collar on the rod.

When the rod 22 is unlocked and pushed inward, the lever 24 is moved to slacken the cable and permit the bell-crank levers to yield and the springs 35 to raise the locking member and unlock the transmission. The lever 24 is normally held by a spring 40 (Figure 1) in the cable-slackening position.

It will now be seen that the operator may lock the transmission in any selected position thereof by pulling the rod 22 outward, and projecting the bolt of the lock 23, by a suitable key, and may unlock the transmission by retracting said bolt.

In the embodiments shown by Figures 8 to 13, inclusive, the organization is as above described, with the following exceptions: The heads 16 of the gear shift rods are provided with extensions 16$^a$, the adjacent edges of the heads are provided with slots 41, opening inward instead of outward like the slots 34 (Figures 3 to 7), and the locking member includes a single dog 42, adapted to engage two of said slots simultaneously.

Figure 8 shows the locking member formed as rod 43, one end of which forms a locking dog 42. Downward pressure is exerted on the rod to engage the dog with the heads 16, by a spring 44, located in a fixed casing 45 and bearing on a shoulder or collar fixed to the rod. A cable 46 is fixed at one end to a lever 47 in the casing 36, and at the opposite end to an arm 48 on the rod 43. The lever is fulcrumed at 49 and its lower end is pivoted at 50 to the slidable operating rod 22. When the operating rod 22 is pulled outward and locked, the cable 46 is slackened and the dog 42 is depressed by its spring to engage the heads 16. When the operating rod is unlocked, a spring 52, which is stronger than the dog spring 44, tensions the cable and causes it to withdraw the dog from the heads 16, the lower end portion of the cable being guided by a pulley 51, so that it is adapted to raise the locking member.

Figures 9 and 10 show the dog 42 as a part of an oscillatory locking member including a neck portion 52$^a$ carrying the dog, and arms 53 pivoted at 54 to fixed supporting ears. The neck portion 52$^a$ is provided with an ear 55, with which the cable 46 is connected.

The operation is in all essential respects similar to that of the embodiment shown by Figure 8, the dog 42 having a swinging, instead of a rectilinear movement.

Figures 16 and 17 show an organization adapted to lock the transmission by engagement of a locking member with the gear shift lever arm 12$^a$, instead of the heads 16. The locking member is a bolt 57, movable horizontally in fixed guides 58 and 59, and having a slot 60 bifurcating its outer end, the bifurcated end being adapted to bestride the lever arm 12$^a$, as shown by full lines in Figure 17, when the arm is in the path of the bolt. When the arm is at either side of the path of the bolt, as shown by dotted lines in Figure 17, one side of the bolt is adapted to bear on the arm and prevent an operative movement thereof.

The bolt 57 is normally projected into locking position by a spring 62, interposed between the guide 59 and a shoulder 63 on the bolt, said shoulder bearing on the guide 58 when the bolt is projected. The bolt may be retracted to unlock the gear shift lever by a cable 65, fixed at one end to an ear 66 on the bolt, and acting when tensioned to retract the bolt against the force of the spring 62. The other end of the cable is fixed to one arm of a two-armed lever 67, which is pivoted at 68 to a fixed ear on the inclined floor portion 18. The other arm of the lever 67 is connected by a relatively stiff spring 69 with a fixed ear 70, in a casing 71, which is fixed to the floor portion 18. Said ear may be formed on the portion 72 of a lock fixed in the casing 71. The spring 69 normally acts through the lever 67 to tension the cable 65 and retract the bolt 57, the lever being in the position shown by Figure 16$^a$ when the bolt is retracted.

The cable is guided by pulleys 74 and 75, arranged in different planes. The lever 67 is moved to the position shown by Figure 16, and thus caused to slacken the cable and permit the projection of the bolt, by a rod 76 which is slidable in the casing 71. When said rod is projected, or moved inward from the position shown by Figure 16$^a$, it restores the lever 67 to the position shown by Figure 16, and permits the projection of the bolt 57. The rod may be moved by a knob on its outer end, or by an ear 78, fixed to and projecting laterally from the rod through a slot in the casing 71. The bolt 72$^a$ of the lock 72 is adapted to engage a notch in the rod, when the latter is projected.

In the organization shown by Figure 18, the heads 16 of the gear shift rods are provided with slots 41, arranged as shown by Figure 11, and a vertically movable locking member is provided, having a dog 80, adapted to engage the slots.

The dog is formed on one end of a rod 81, which is normally raised from the heads 16, by a spring 82, and is adapted to be depressed to engage the dog with the heads, by the tensioning of a cable 83. Said cable is fixed at one end to an arm 84, on the rod 81, and is guided by a pulley 85 so that, when tensioned, it forces the dog downward against the force of the spring 82, into engagement with the heads 16. The other end of the cable is fixed to an operating rod 87, which is slidable in a casing 88 beside a lock 89, the casing being fixed to the floor 15. When the operating rod 87 is moved outward, it tensions the cable and projects the dog 80, and may be locked by the lock 89 to hold the dog projected. When the operating rod is unlocked, it is forced inward by a spring 90.

The operating rod 87 may be connected by a cable 91 with a slidable stop member 92, adapted to be moved to position to prevent the inward movement of a starting switch plunger 93. Said stop member is normally moved out of the path of the plunger by a spring 94. The cable 91 is so guided by a pulley 95 that, when tensioned, it moves the stop member 92 into the path of the plunger. In this instance the starting switch is fixed to the inclined floor section 18.

The cable 65 shown by Figures 16 and 17, may be connected at 96 (Figure 17) with one end of a cable 91ᵃ the other end of which is connected with the stop 92, the arrangement being such that when the locking member 57 is projected to lock the transmission, the stop 92 is also projected to lock the starter switch.

It will be seen by reference to Figures 3 to 7, Figures 11 to 15, and Figures 16 and 17 that the locking member is adapted to lock the transmission mechanism, either in gear or in a neutral position.

It will be seen that in the embodiments of the invention shown by Figures 1 to 15 and by Figure 18 the locking member directly engages and releases an element of the transmission mechanism formed by a plurality of gear shift rods, and that in the embodiment shown by Figures 16 and 17 the locking member directly engages and releases an element of the transmission mechanism formed by the gear shift lever. The cooperation of the locking member with either of said elements enables the transmission mechanism to be locked either in "reverse" or in "neutral" so that the vehicle can be quickly backed out of a garage in case of fire, or backed on a street in case of an emergency requiring such movement, without the loss of time which would be involved by manipulation of the key to unlock the transmission mechanism. This is not possible when a locking member is provided which directly engages and locks a transmission gear on the rear axle.

The transmission mechanism may also be locked "in gear" when the loss of time involved by the manipulation of a key to unlock the mechanism is not objectionable. It will be seen, therefore, that my invention permits the locking of the transmission mechanism in various conditions at the option of the driver, the condition being determined by the position of the element engaged by the locking member, so that the vehicle may be left locked against operation by its motor, but free to be moved by force externally applied without unlocking, or left locked against the possibility of movement until unlocked.

I claim:

1. The combination with an automobile transmission mechanism, one element of which is a gear shift lever, and another element a plurality of gear shift rods with which the lever is engageable, of a locking member which is movable to directly engage one of said elements selectively in any of its positions and thereby lock said mechanism in its corresponding position, and operating means including an operating rod movable by the driver, a flexible member connecting the rod and the locking member, means for yieldingly maintaining the locking member in a predetermined position from which it is movable to another position by the application of tension on the flexible member through the instrumentality of the operating rod, and means for locking said operating rod to maintain the locking member in locking position.

2. The combination with an automobile transmission including gear shift rods, the heads whereof are provided with locking member-engaging slots, of a locking member which is movable to enter and leave said slots, and thereby lock and release said mechanism in and from any selected one of its positions, means for yieldingly maintaining the locking member in a predetermined position, and operating means including an operating rod movable by the driver, a flexible cable intermediate said rod and the locking member, and means for locking the operating rod to maintain the locking member in its locking position.

3. The combination with an automobile transmission mechanism including gear shift rods, the heads whereof are each provided with dog-receiving slots, of a locking member provided with means, adapted to simultaneously engage two slots, one in each head, and thereby lock said mechanism, means for yieldingly maintaining the locking member in its inoperative position, a flexible cable attached to said locking member, an operating rod for applying tension to said cable to move the locking member into locking position, and means for locking the rod to maintain the locking member in locking position.

4. The combination with an automobile transmission mechanism including gear shift rods, the heads whereof are each provided with dog-receiving slots, of a locking member pivoted to oscillate on a fixed support and provided with means, adapted to simultaneously engage two of said slots, one in each head, and thereby lock said mechanism selectively in any of its positions, means for yieldingly maintaining the locking member in a predetermined position, and operating means including an operating rod movable by the driver, a cable intermediate said rod and the locking member, and means for locking the operating rod to maintain the locking member in its locking position.

5. The combination with an automobile transmission mechanism, of a locking member which is movable to lock or release said mechanism in or from any selected position thereof, and operating means including an operating rod movable by the driver, a cable intermediate the rod and the locking member, means for locking said operating rod to maintain the locking member in its locking position, means being provided for yieldingly maintaining the locking member in a predetermined position, from which it is movable to another position, through the instrumentality of the operating rod, a starter switch, a movable switch-controlling member adapted to render the starter switch inoperative, said member being normally in an inoperative position, and connections between said controlling member and the operating rod, whereby the controlling member is held in a position rendering the starter switch inoperative when the operating rod is locked.

6. The combination with an automobile transmission mechanism, of a locking member which is movable to lock or release said mechanism in or from any selected position thereof, and operating means including an operating rod movable by the driver, a cable intermediate the rod and the locking member, means for locking said operating rod to maintain the locking member in its locking position, means being provided for yieldingly maintaining the locking member in a predetermined position, from which it is movable to another position, through the instrumentality of the operating rod, a starter switch, a normally inoperative stop for the plunger of said switch, and connections, including a flexible cable, connecting the operating rod with said stop and adapted to move the latter, the arrangement being such that when the operating rod is locked, the stop is confined in the path of the plunger to prevent the operation of the switch.

7. The combination with an automobile transmission mechanism, one element of which is a gear shift lever, and another element a plurality of gear shift rods with which the lever is engageable, of a locking member movable into and out of engagement with one of said elements to lock and release said mechanism, and operating means for moving said locking member comprising an operating rod and a flexible cable connecting the rod with the locking member, the parts being so arranged that tension only is exerted on the cable when the locking member is moved.

8. The combination with an automobile transmission mechanism, one element of which is a gear shift lever, and another element a plurality of gear shift bars, of a locking member movable to engage one of said elements to lock said mechanism selectively in any position thereof, a housing enclosing said locking mechanism, rods and a portion of said lever, means for yieldingly maintaining the locking member in position, and operating means including an operating rod movable by the driver, a housed flexible cable intermediate said rod and locking member, and means for locking said rod to maintain the locking member in locking position, the parts being arranged so that the cable is at all times under tension.

9. The combination with an automobile transmission mechanism comprising a gear shift lever and a plurality of gear shift rods, of a locking member movable to directly engage said rods to lock said mechanism selectively in any position thereof, a self-starter switch, a locking member movable to lock said switch in open position, operating means including an operating rod movable by the driver and flexible elements connecting said operating rod with both of said locking members, and means for locking the operating rod to maintain both said locking means in locking position.

In testimony whereof I have affixed my signature.

EDGAR J. MARTEL.